United States Patent [19]
Wilson

[11] 3,772,862
[45] Nov. 20, 1973

[54] APPARATUS FOR REMOVING TOBACCO LEAVES FROM ROWS OF TOBACCO PLANTS AND FOR HANDLING THE REMOVED LEAVES

[75] Inventor: Robert W. Wilson, Charlotte, N.C.

[73] Assignee: Powell Manufacturing Company, Inc., Bennettsville, S.C.

[22] Filed: Mar. 29, 1972

[21] Appl. No.: 239,221

[52] U.S. Cl. .............................................. 56/27.5
[51] Int. Cl. .......................................... A01d 45/16
[58] Field of Search .................... 56/27.5; 130/30 R, 130/31 R; 171/61; 294/55

[56] References Cited
UNITED STATES PATENTS

| | | | |
|---|---|---|---|
| 3,083,517 | 4/1963 | Wilson | 56/27.5 |
| 3,093,949 | 6/1963 | Splinter | 56/27.5 |
| 3,507,103 | 4/1970 | Pickett et al. | 56/27.5 |
| 3,654,753 | 4/1972 | Gervais | 56/27.5 |

Primary Examiner—Antonio F. Guida
Attorney—John W. Malley et al.

[57] ABSTRACT

Tobacco combine apparatus including a wheeled frame adapted to be self-propelled and steered along a row of mature tobacco plants having vertically movable leaf defoliating mechanism thereon for removing tobacco leaves from the tobacco plants in the row as the frame is moved therealong, a conveyor system for conveying the removed leaves rearwardly and upwardly to a pair of laterally spaced discharge stations and a fork lift mechanism at the rear of the vehicle frame for detachably engaging a trailer vehicle assembly adapted to carry a series of baskets or bin-like structures, the fork lift mechanism functions to move the trailer from a ground engaging position to an elevated operative position rearwardly and below the discharge stations of the conveyor system where an attendant stationed on the forward central portion of the bed of the trailer moves successive empty bins from the trailer onto a pair of spaced end stations on a laterally extending platform providing a leaf loading station laterally inwardly of each end station beneath a discharge station of the conveyor system, the platform also provides a central station for receiving successive filled bins as the attendant moves successive empty bins into each loading station and from which the attendant moves filled bins onto the trailer.

11 Claims, 7 Drawing Figures

APPARATUS FOR REMOVING TOBACCO LEAVES FROM ROWS OF TOBACCO PLANTS AND FOR HANDLING THE REMOVED LEAVES

This invention relates to the harvesting of tobacco leaves and more particularly to improved apparatus for removing tobacco leaves from tobacco stalks and handling the removed tobacco leaves in the field.

Bright leaf tobacco has conventionally been harvested in the field by manually removing the leaves from the stalks of tobacco in the field. Since the late 1940's, so-called tobacco harvesting machines have been commercially available to tobacco farmers but these machines do nothing more than enable the leaf primers to ride through the field as they manually remove the leaves.

In the mid-1950's, basic research was undertaken to develop mechanical units capable of removing bright leaf tobacco leaves from the stalks entirely mechanically. The initial defoliating units operated on the principle of striking the leaves with a downward impact action adjacent their connection with the stems. The initial unit of this type is disclosed in my U.S. Pat. No. 2,816,411 dated Dec. 17, 1957. Somewhat later, a defoliating unit operating on the principle of a downward wiping action was developed and this unit is disclosed in U.S. Pat. No. 2,834,174 dated May 13, 1958, jointly in my name and the name of Charles W. Suggs. Since the development of the rubber wiper unit, other types of mechanical defoliating units have been developed, a particularly effective unit operating on the principle of an upward cutting action is disclosed in Splinter U.S. Pat. No. 3,093,949 dated June 18, 1963.

The above-mentioned patents relating to various mechanical bright leaf tobacco defoliating units disclose the units as being mounted on wheeled frames movable through a tobacco field along the rows of tobacco plants with the defoliating units disposed on opposite sides of the row to effect the defoliation as the vehicle moves along the row. The disclosures contained in these patents generally emphasize the operation of the units themselves in effecting removal from the plants. The patents do not particularly disclose any arrangement for handling the leaves removed from the plants by the defoliating units in addition to simple collection in bulk. For example, in my 1957 patent there is disclosed a simple conveyor arrangement for moving the defoliated leaves from the defoliating units upwardly and rearwardly into containers which collect the leaves in bulk form. With an arrangement of this type the containers, full of bulk leaves, were simply transported to the barn where they were handled in conventional fashion.

With the advent of bulk curing, see Hassler U.S. Pat. No. 3,105,713 dated Oct. 1, 1963, and U.S. Pat. No. 3,110,326 dated Nov. 12, 1963, it became possible to provide apparatus in which the leaves removed from the plants by mechanical defoliating units could be handled in the field to the point where they were mounted within bulk curing racks. My U.S. Pat. No. 3,083,517 dated Apr. 12, 1963, discloses the first so-called tobacco combine capable of performing these operations in the field commercially.

Since the issuance of my tobacco combine patent, there have been many different types of tobacco combines proposed. The effectiveness of the proposed combines is not so much limited by the effectiveness of the defoliating units provided, since such units have been perfected to a point sufficient to effect removal of the leaves without severely damaging the crop, as in how the leaves are handled by the combine once they have been removed by the mechanical defoliating units. The combine disclosed in my aforesaid combine patent handled the leaves in bulk form by conveying the same upwardly to an elevated platform on the vehicle where the leaves were directly discharged into a collector structure provided on one half of a turntable. When sufficient leaves were discharged into the collector structure, the turntable was indexed 180° moving a new collector structure into the discharge position and the collector structure with leaves therein into a position enabling the operator to mount the leaves within a bulk curing rack. The arrangement further provided a wheeled platform on the vehicle on which the filled bulk curing racks could be stored for transportation to the barn.

While this arrangement provided the ultimate in leaf handling in the field, in that the leaves were handled to the point that they were in racked form ready to go into the barn, the arrangement was complex requiring heavy and expensive equipment and a handling space on the combine of almost prohibitive dimensions. The alternative to full racking on the combine heretofore has been to simply provide a relatively large container for receiving the leaves in bulk form. In general, these large containers are provided with wheels, the combine being provided with some sort of elevating means such as a fork lift or the like, for picking up the container from a ground position and elevating it into a position for receiving the leaves at a level above the plants in operation. While an arrangement of this type greatly simplifies the equipment required to handle the leaves, as well as the space necessary to provide a station for attendants, empty rack sections, etc., and alleviated the difficult manual labor required in handling fully racked bales of leaves, this system ended up with the leaves in a condition which made their handling after being transported to the barn considerably more difficult and laborious. Thus, at the barn, it was still necessary for operators to remove the leaves from the container and place them in rack loading mechanisms and then effect the racking operation.

In summary, it can be stated that the prior art proposals have either provided for substantially the entire leaf handling operation to be performed in the field on the combine, or alternatively, a minimum of leaf handling in the field on the combine, as by collection in a relatively large container with the majority of the leaf handling being subsequently performed at the barn.

The present invention is based upon the proposition that neither of these two extremes provides optimum efficiency in terms of the costs of equipment in performing the leaf handling operations, the amount of labor required in operating the equipment and effecting the manual leaf handling operations required and the severity and difficulty of the latter. In the case of the tobacco combine providing equipment capable of handling the leaves to a point of being mounted within racks on the combine, the equipment is quite costly and presents size problems and the manual labor required is particularly difficult. The labor clearly cannot be performed by women and children as is the case with leaf handling operations at the barn. On the other hand, where the leaf handling on the combine is limited to simple collection within a relatively large bulk collector, an attendant is required but such attendant has very little if any duties to perform, and his time is utilized most inefficiently. Indeed, such an attendant could well be used at the barn aiding in the leaf handling procedures which are necessary with this type of operation.

The present invention is based upon the underlying principle that optimum efficiency can be obtained by providing equipment on the combine which enables an attendant to handle the leaves to a stage which is intermediate bulk collection and full racking. In accordance with the principles of the present invention, the combine is provided with relatively inexpensive equipment enabling an unskilled attendant to handle the leaves so that they are collected in a series of bin-like structures capable of being handled relatively easily with unskilled labor. By the provision of such equipment the productive work which the attendant on the combine is capable of accomplishing is greatly increased in comparison with the simple collection of the leaves on the combine in large bulk containers. This increase in the effectiveness of the attendant on the combine is reflected in a reduction in the labor required to finally achieve racking of the leaves at the barn. The present system permits a more efficient utilization of the total labor force with equipment which is less costly in comparison either with the total combine equipment for fully racking in the field, or the bulk collection handling on the combine in the field and the subsequent racking of the tobacco at the barn.

Accordingly, it is an object of the present invention to provide apparatus for removing tobacco leaves from rows of tobacco plants and for handling the removed tobacco leaves in the field which embodies the above noted principles and achieves the advantages thereof.

Another object of the present invention is the provision of apparatus of the type described embodying an improved conveyor system capable of adjustment into two positions, one embodying operation in accordance with the principles of the present invention and the other embodying operation with a conventional bulk collection container.

Another object of the present invention is the provision of apparatus of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

Figure 1:
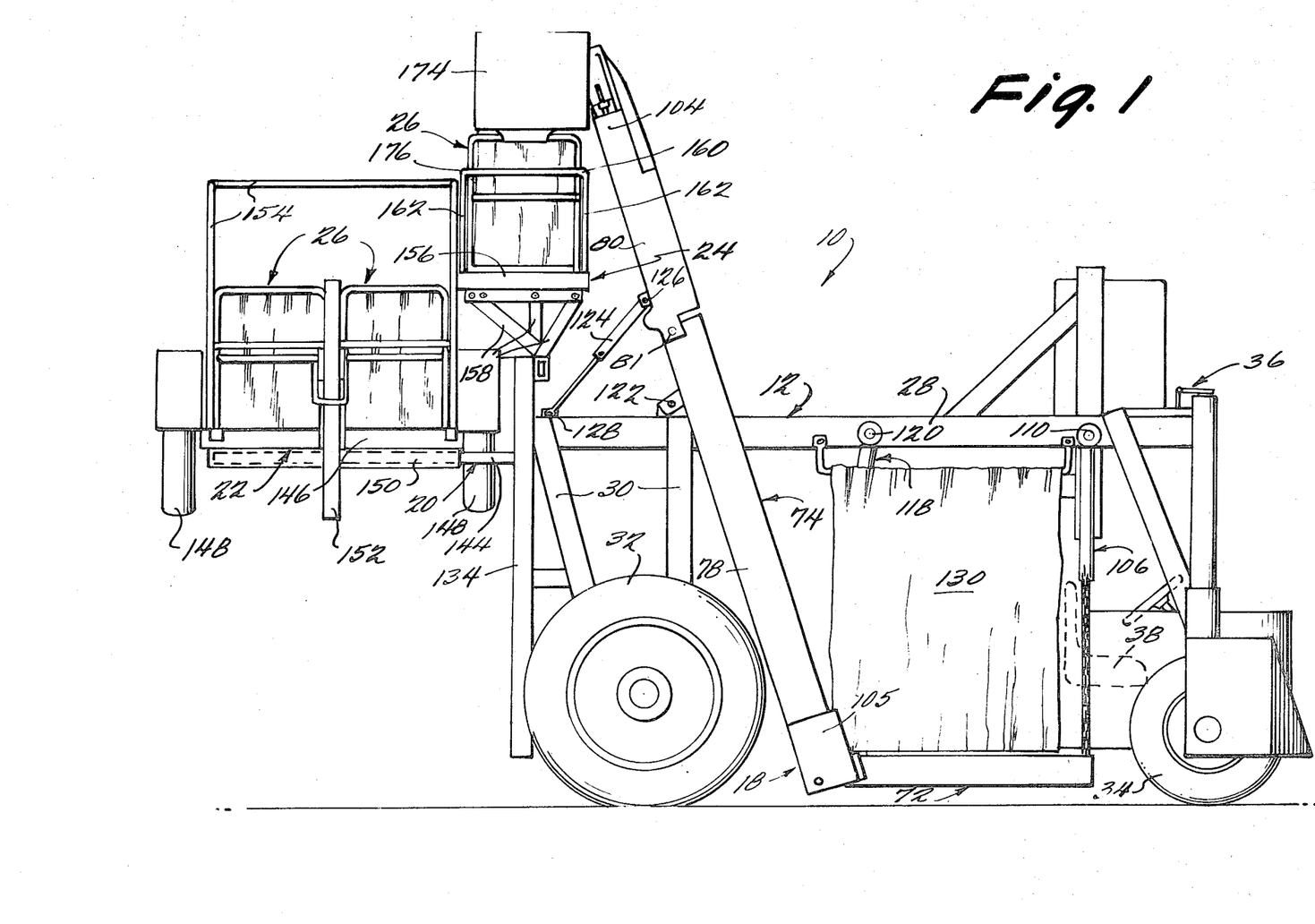
FIG. 1 is a side elevational view of an apparatus embodying the principles of the present invention.
Figure 2:
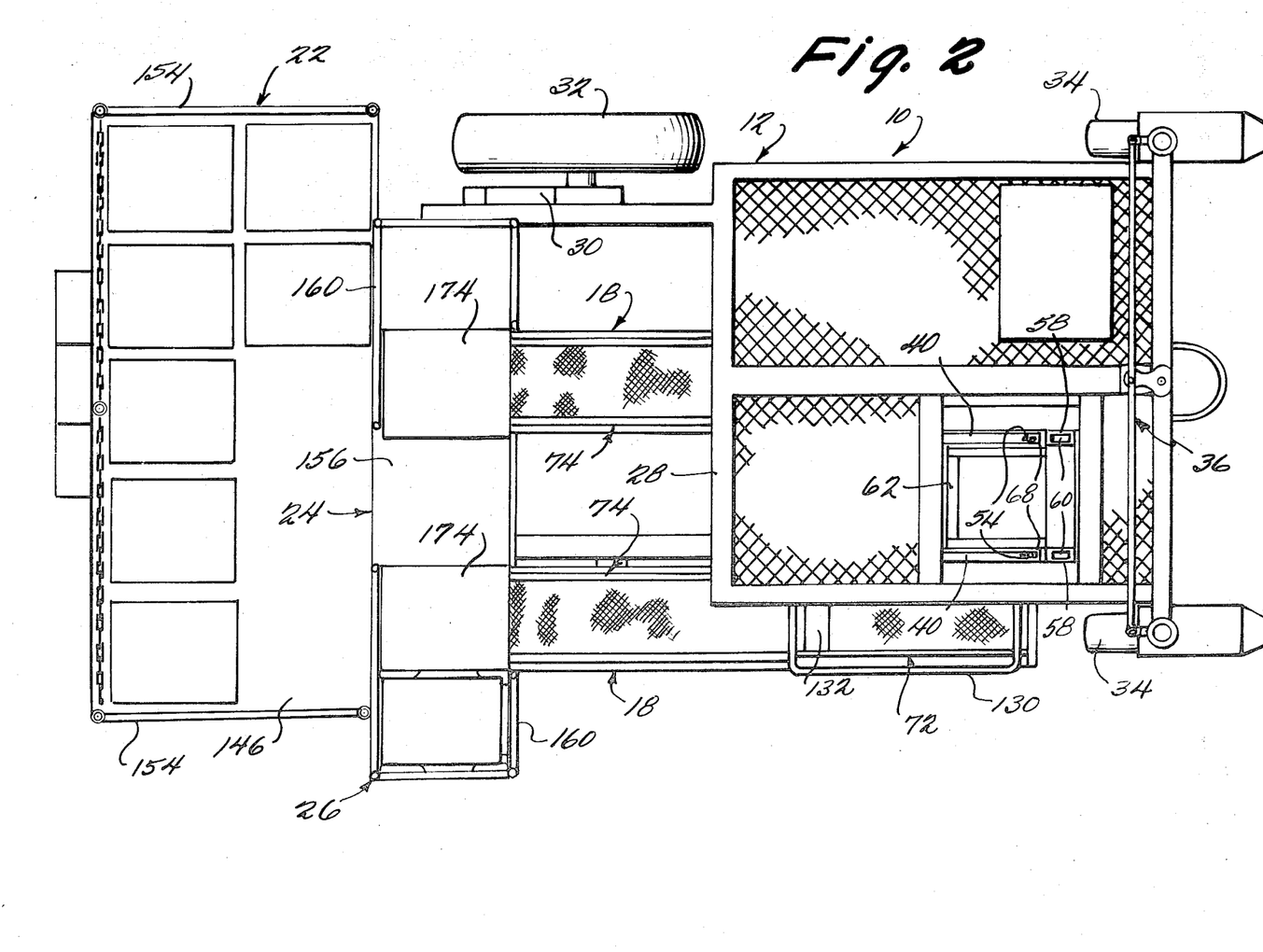
FIG. 2 is a top plan view of the apparatus shown in FIG. 1.
Figure 3:
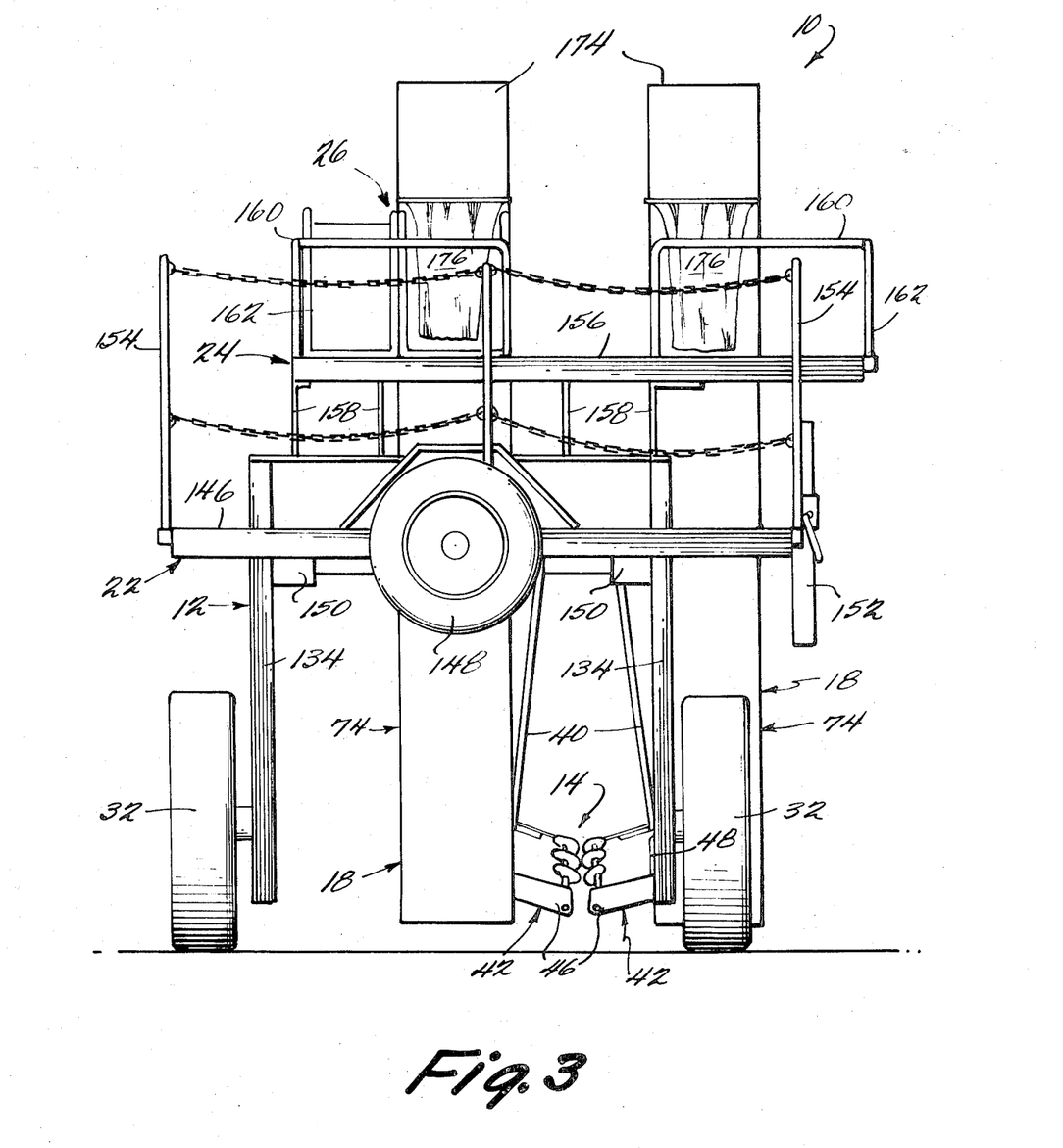
FIG. 3 is a rear elevational view of the apparatus.

Referring now more particularly to the drawings, there is shown in FIGS. 1–3 therein apparatus, generally indicated at 10, embodying the principles of the present invention. The apparatus 10 includes a wheeled vehicle frame, generally indicated at 12, movable through a tobacco field along a row of tobacco plants therein so that a pair of cooperating tobacco leaf defoliating units, generally indicated at 14, can effect removal of tobacco leaves therefrom. The units 14 are mounted on the wheeled vehicle frame 12 by a vertically movable mounting mechanism, generally indicated at 16, operable to position the units on opposite sides of a row of tobacco plants in any selected vertical position so as to remove selected leaves therefrom as the wheeled vehicle frame is moved therealong. A conveyor system, generally indicated at 18, is carried by the frame 12 for collecting the leaves removed by the defoliating units 14 on opposite sides of the row and moving the removed leaves rearwardly and upwardly with respect to the frame to discharge positions spaced above the plants in the row. Carried on the rearward portion of the frame 12 is a fork lift mechanism, generally indicated at 20, operable to cooperate with a horizontal support structure preferably in the form of a trailer assembly, generally indicated at 22, so as to move the trailer assembly 22 between a lower ground-engaging position and an elevated operative position where it is maintained during movement of the wheeled vehicle frame 12 through the field along the row of plants. A platform assembly, generally indicated at 24, is carried by the vehicle frame 12 in a position to cooperate with the discharge positions of the conveyor system 18 and an operator stationed on the forward position of the trailer assembly 22 when disposed in its raised operative position. Finally, the apparatus 10 includes a series of tobacco leaf receiving bin-like structures or baskets 26 operable to be supported in both empty and filled condition on the trailer 22 and to be moved with respect to the platform assembly in supported relation thereon into cooperating relation with the discharge positions of the conveyor system under the control of an attendant stationed on the trailer assembly 22 in its raised operating position.

The wheeled vehicle frame may be formed of any conventional construction. In the preferred embodiment shown in the drawings, the frame is made up of conventional metallic structural elements suitably fixed together as by welding or the like, to form a generally horizontally extending section 28 of skeletonized configuration. The width of the horizontal section is of a dimension sufficient to extend over two rows of tobacco plants. At the rear of the horizontal frame section 28 there is provided a pair of depending wheel supporting strut sections 30 within which rear wheels 32 are journaled.

In the preferred embodiment shown, the wheeled vehicle frame 12 is of the self-propelled type and rear wheels 32 are provided with suitable means to effect the driving action in accordance with conventional practice. It will be understood however, that the present invention contemplates that the wheeled vehicle frame 12 could be suitably pulled or even directly mounted for movement through the field. The preferred embodiment of the wheeled vehicle frame 12 provides spaced steerable front wheels 34 which are longitudinally aligned with the spaced rear wheels 32. Where the vehicle frame 12 is self-propelled, the front vehicle wheels are steerable, as by a conventional power steering mechanism, indicated at 36, operable by a driver, attendant or operator stationed at a seat 38 mounted in depending relation from the central forward portion of the horizontal frame section 28.

While the horizontal frame section 28 is of a size to extend over two rows of tobacco plants and the wheels 32 and 34 are spaced apart so as to ride in the furrows outwardly of the two rows, the preferred apparatus 10 shown in the drawings is a one-row unit in that only a single pair of cooperating defoliating units is provided for removing the leaves from one row of plants as the wheeled vehicle is moved therealong. It will be understood, however, that more than one pair of defoliating units may be provided if desired. With the single pair of units 14 shown, the units are disposed in laterally offset relation to the center line of the wheeled frame 12, so as to cooperate with a tobacco plant row adjacent the right side of the vehicle as the latter is moved along the field.

It will be understood that the present invention is not limited to the use of any particular type or construction of defoliating units. Any type and construction may be utilized including any of the known constructions as disclosed in the aforesaid patents. Indeed, it is preferable that the apparatus 10 have the capability of utilizing different types of defoliating units and to facilitate this capability each type of defoliating unit is preferably mounted on its own frame structure providing a similar attaching mechanism cooperable with a mating attaching mechanism on the vertically movable mounting mechanism 16 to enable quick and simple changing of the units.

The capability of being able to conveniently change defoliating units is particularly desirable in view of the present state of the defoliating unit art, since it is well known that certain types of units are more effective than others in the first primings and less effective in the last primings. In the preferred apparatus 10 shown, cooperating rubber wiper units of the type disclosed in U.S. Pat. No. 2,834,174 are utilized to effect the initial primings and cooperating cutter units of the type disclosed in U.S. Pat. No. 3,093,949 are utilized to effect the final primings.

To illustrate the frame structure and attaching mechanism utilized with the defoliating units for facilitating quick change as aforesaid, the arrangement provided for rubber wiper type defoliating units are shown in the drawings because of the desirability to provide for limited relative transverse movement between the units and the necessity to provide for lateral conveyance of the leaves from the units. It will be understood that the cutter bar units can be mounted on a rigid frame structure and that there is no need to provide for additional lateral conveyance of leaves with these units since their operation inherently serves to that a the leaves laterally outwardly a distance considerably further than the rubber wiper units.

Figure 4:
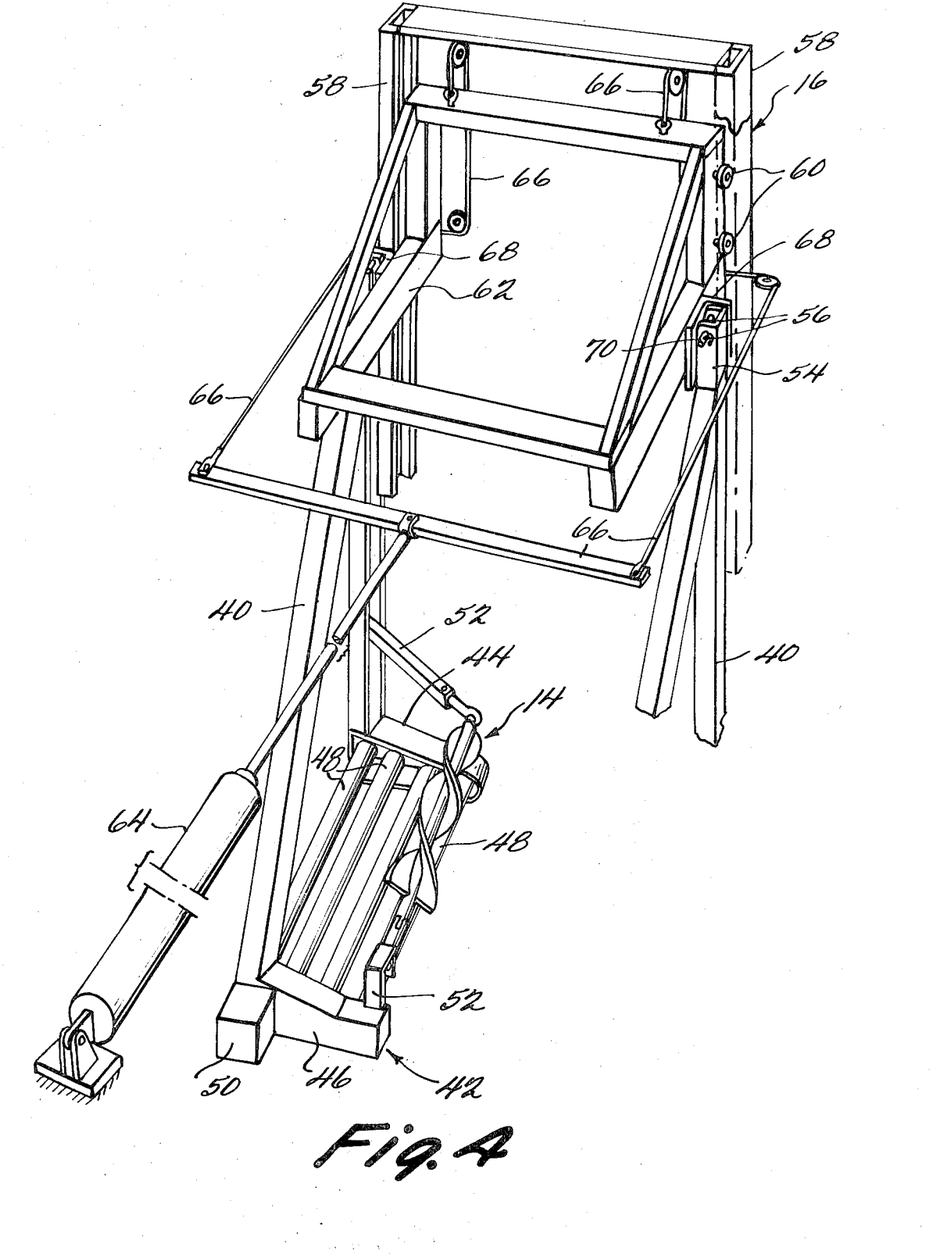
FIG. 4 is a somewhat schematic perspective view of the defoliating units and the vertically movable mounting mechanism therefor embodied in the apparatus.

As best shown in FIG. 4, each defoliating unit 14 is associated with a separate vertically extending supporting frame structure 40, which, as shown, is generally triangular in shape. Fixedly mounted on the lower portion of each frame structure 40 and extending laterally inwardly and downwardly therefrom in a direction toward the row of tobacco plants is a lateral leaf conveyor assembly, generally indicated at 42.

As best shown in FIG. 4, each conveyor assembly 42 includes a forward journal box 44 rigidly secured to the forward portion of the associated frame structure 40 and extending laterally downwardly and inwardly therefrom, a parallel rearward gear drive and journal box 46 rigidly secured to the rearward portion of the associated frame structure 40 and a plurality of parallel rollers 48 extending between the forward and rearward journal boxes 44 and 46. It will be understood that each rearward journal box 46 is provided with gears for drivingly rotating the associated rollers 48 in the same direction such that a tobacco leaf deposited on the upper peripheries thereof will be moved laterally outwardly in a direction away from the tobacco row. Any suitable means may be provided for driving the gears, such as a hydraulic motor or the like as indicated at 50. The rearward journal box 46 also includes gears for driving one of the defoliating units 14 associated therewith which is mounted in upwardly and forwardly inclined relation above the inner portion of the conveyor assembly 42, as by a pair of journal brackets 52.

The attaching mechanism for each vertical frame structure 40 may take any convenient form, the preferred embodiment shown being in the form of a channel section 54 rigidly secured to the upper portion of the frame structure 40 along the inner surface thereof with the flanges thereof extending vertically. The flanges are formed with horizontally aligned pin receiving openings 56 adjacent the upper end thereof.

The vertically movable mounting mechanism 16 may likewise assume many different forms. An essential prerequisite of the mechanism 16 is that it must provide the operator with means for instantaneously moving the defoliating units 14 into any desired position of vertical adjustment. This capability enables the operator to select the leaves on the row of plants which will be removed by the defoliating unit as the wheeled vehicle frame moves along the row. A preferred embodiment of the vertically movable mounting mechanism 16 is best illustrated in FIG. 4 and includes a pair of vertically extending guideways 58 rigidly secured to the horizontal frame section 28 in transversely spaced opposed relation adjacent the forward portion thereof. Mounted within the guideways 58 for vertical guided movement therein, as by a plurality of guide rollers 60, is a truss-like rigid frame assembly 62. The frame assembly 62 is disposed in a position directly over the row of tobacco plants when the vehicle frame 12 is moved therealong. Any suitable means may be provided for effecting vertical movement of the rigid frame assembly 62. As shown, a hydraulic piston and cylinder unit 64 is mounted in generally horizontal position on the horizontal frame section 28 and is connected with the rigid frame assembly 62 by a cable and pulley system, generally indicated at 66. As best shown in FIG. 4, the cable and pulley system 66 includes a pair of cables having one of their ends connected to the ends of a crossbar, the central portion of which is connected to the end of the piston rod of the unit 64. The cables extend from the crossbar around first pulleys mounted on the vehicle frame 12 for rotation about spaced vertical axes, inwardly and around second pulleys mounted on the frame for rotation about spaced horizontally extending axes and upwardly and over third pulleys fixed to the frame for rotation about a common horizontally extending axis. The opposite ends of the cables extend downwardly from the third pulleys and are connected to the upper portion of the frame assembly 62. In this way, as the piston rod of the unit 64 is retracted, the cable and pulley system 66 will effect an upward movement of the frame assembly 62. Conversely, an extended movement of the piston rod of the unit 64 will permit a lowering of the frame assembly 62 by a gravity action through the operation of the cable and pulley system 66.

Rigidly secured to the forward portion of the frame assembly 62 at each side thereof is a depending attaching member 68, which is preferably in the form of a section of angle iron, disposed with one flange welded to the associated outer side of the frame assembly 62 and its other flange extending outwardly in forwardly disposed relation. Welded to the upper portion of each outwardly extending flange is an attaching pin 70 which extends rearwardly therefrom so as to engage within the aligned openings 56 provided by the attaching mechanism of the defoliating unit frame structure. A snap ring pin or the like is engageable through an appropriate opening in the free end of the attaching pin to retain the defoliating unit frame structure in attached relation. It will be noted that the center of gravity of each defoliating unit assembly is such as to bias the forward flange of each channel section 54 into engagement with the outwardly extending flange of the associated attaching member 68. More importantly, the free edges of the flanges of each channel section 54 are biased into engagement with the other flange of associated attaching member 68 with the engagement of the attaching pin 70 within the openings 56 permitting an outward swinging movement of each defoliating unit assembly about a longitudinally extending horizontal axis.

Figure 5:
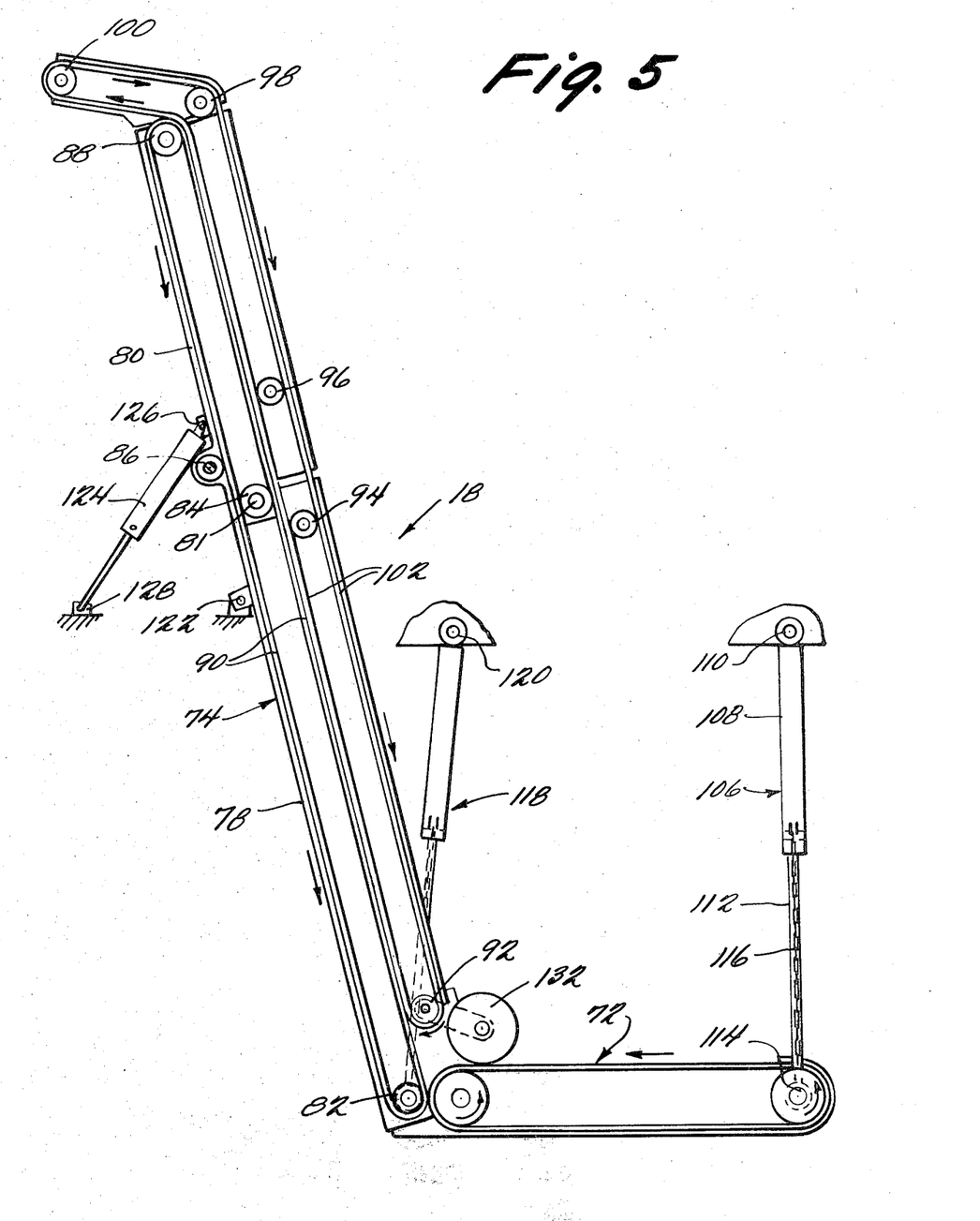
FIG. 5 is a side elevational view, with parts broken away, illustrating certain cooperating conveyor assemblies forming a part of the conveyor system of the present apparatus and the manner in which they are mounted.

The conveyor system 18, as previously indicated, is operable to receive the removed leaves at spaced positions laterally outwardly of the tobacco row and the defoliating units on opposite sides thereof. To this end, the system is preferably comprised of two separate laterally spaced units of similar construction, one of which is shown in FIG. 5. Since the units are of similar construction, a description of one in relation to the illustration of FIG. 5 should suffice to give an understanding of both.

As best shown in FIG. 5, a unit of the conveyor system 18 includes a horizontal belt conveyor assembly 72 for receiving the leaves discharged laterally from the associated defoliating unit and conveying the same rearwardly and an upwardly inclined dual belt conveyor assembly 74 for receiving the leaves from the horizontal belt conveyor and conveying them upwardly and rearwardly to an elevated discharge station. The horizontal belt conveyor assembly is of any conventional construction including the usual frame within which a plurality of parallel rollers are journaled, the rollers having the usual endless belt trained thereabout to provide an upper operative flight or run and a lower return flight or run. The conveyor assembly is driven by any conventional means so that the operative run moves in a rearward direction.

The upwardly inclined conveyor assembly 74 is likewise made up of conventional components, however, the arrangement of the components is, in accordance with the principles of the present invention, preferably such as to permit adjustment of the discharge end thereof into either one of two selected positions depending upon the particular mode of operation desired as will become more apparent hereinafter. To this end, the inclined conveyor assembly 74 includes a pair of lower and upper frame sections 78 and 80 which are pivotally interconnected, as indicated at 81.

Journaled in the frame sections 78 and 80 is a first series of rollers 82, 84, 86 and 88, about which a first endless conveyor belt 90 is trained and a second series of rollers 92, 94, 96, 98 and 100, about which a second cooperating endless belt 102 is trained. As shown in FIG. 5, the roller 82 is journaled within the lower end portion of the lower frame section 78, the roller 84 is journaled within the upper end of the lower frame section 78 with its axis coincident with the pivotal axis 81, the roller 86 is journaled within the lower portion of the upper frame section 80, and the roller 88 is journaled within the upper portion of the upper frame section 80. The first endless belt 90 is trained about this first series of rollers so as to provide an operative run which extends over rollers 82, 84 and 88 and a return run which extends over rollers 88, 86 and 82, thus accommodating a pivotal movement of the upper frame section from the in line operative position shown in FIG. 5 to a second operative position wherein the upper frame section extends rearwardly at an angle to the lower frame section.

Also as shown in FIG. 5, roller 92 is journaled within the lower portion of the lower frame section at a position forwardly and above the roller 82, roller 94 is journaled within the upper portion of the lower frame section 78 at a position forwardly and below the roller 84, roller 96 is journaled within the lower portion of the upper frame section 80 at a position forwardly and above the roller 84, roller 98 is journaled within the upper portion of the upper frame section 80 at a position forwardly and above the roller 88, and roller 100 is journaled within an adjustable upper portion of the upper frame section at a position rearwardly and above roller 88. The endless belt 102 is trained about this second series of rollers so as to provide an operative run contiguous with the operative run of the belt 90 which is trained over rollers 92, 94, 96, 88 and 100 and a return run which is trained over rollers 100, 98, 96, 94 and 92. It will be noted that the aforesaid adjustment of the upper frame section 80 can be accommodated by suitably adjusting the relative position of roller 100. As before with the conveyor assembly 72, an appropriate driving means is provided. As shown schematically in FIG. 1, such means preferably includes a hydraulic motor 104 drivingly connected with roller 88 which serves to move the operative runs of the belts 90 and 102 in an upward direction at the same speed as well as the belt of the conveyor assembly 72, by a rotary driving connection, indicated schematically at 105 in FIG. 1, driven from roller 82 and connected respectively with the roller 92 and the rearward roller of the conveyor assembly 72.

FIG. 5 also illustrates a preferred arrangement for mounting the conveyor assemblies 72 and 74 on the vehicle frame 12. It will be understood that other mounting arrangements may be utilized, however, the preferred arrangement shown is particularly desirable because of its simplicity and the flexibility of adjustment provided thereby.

First, it will be noted that the rearward end of the frame of the horizontal conveyor assembly 72 is suitably interconnected with the lower frame section 78 of the upwardly inclined conveyor assembly 74 at a position coincident with the axis of roller 82. The forward end of the frame of the horizontal conveyor assembly 72 is adjustably supported on the vehicle frame 12 by a telescopically adjustable connecting rod assembly 106 which includes a hollow upper member 108 having its upper end pivotally supported on the frame 12, as indicated at 110, and a lower member 112 telescopically disposed within the hollow member 108 and having its lower end pivotally interconnected with the forward end of the frame of the conveyor assembly 72, as indicated at 114. The assembly 106 also includes a length of chain 116 for determining the operative length of the telescoping members 106 and 112, by adjustably anchoring the same between the latter. As shown, the lower end of the chain 116 is anchored adjacent the conveyor assembly and the upper end is adjustably engaged within spaced lugs fixedly mounted on the lower exterior of the upper hollow member 108.

A similar telescopically adjustable connecting rod assembly 118 is pivotally interconnected at its upper end with the vehicle frame 12 at a position indicated at 120 rearwardly of the pivotal connection 110 and has a suitable connection at its lower end with the rearward end of the conveyor assembly 72 preferably at its position of inter-connection with the inclined conveyor assembly 74. The upper rearward portion of the lower frame section 78 of the inclined conveyor assembly 74 is pivotally supported on the vehicle frame 12 by a suitable pivot connection indicated at 122 and the upper frame section 80 is adjustably supported thereon by a pinned telescopic link assembly 124 having its ends pivoted respectively therebetween as indicated at 126 and 128.

It can be seen that the above described mounting arrangement provides for adjustment of the level of the horizontal conveyor assembly 72 to accommodate the particular working level of the defoliating units along the tobacco plant row. To insure transfer of the leaves from the defoliating unit to the horizontal conveyor assembly 72 a curtain 130 is slideably supported on the vehicle frame 12 in a position alongside the outer edge of the horizontal conveyor assembly 72. It will also be noted that the aforesaid adjustment of the horizontal conveyor assembly 72 is accomplished without effecting its cooperating relationship with the inclined conveyor assembly 74. The leaves moving rearwardly in supported relation on the upper operative flight of the belt of the horizontal conveyor assembly 72 will always be presented to the inclined conveyor assembly 74 in a position to engage the lower end of the operative flight of the belt 90 so as to be moved thereby upwardly into engagement with the lower end of the operative flight of the belt 102 and to be carried therebetween to the discharge ends of the operative flights. To further insure proper transfer of leaves from the horizontal conveyor assembly to the inclined conveyor assembly a roller 132 of foamed material is mounted on the rearward end portion of the horizontal conveyor assembly 72 in a position so that its lower periphery is in engagement with the upper surface of the operative run of the belt thereof. The roller insures that the leaves carried by the belt are retained thereon for proper transfer to the inclined conveyor assembly 74 as aforesaid.

Figure 6:
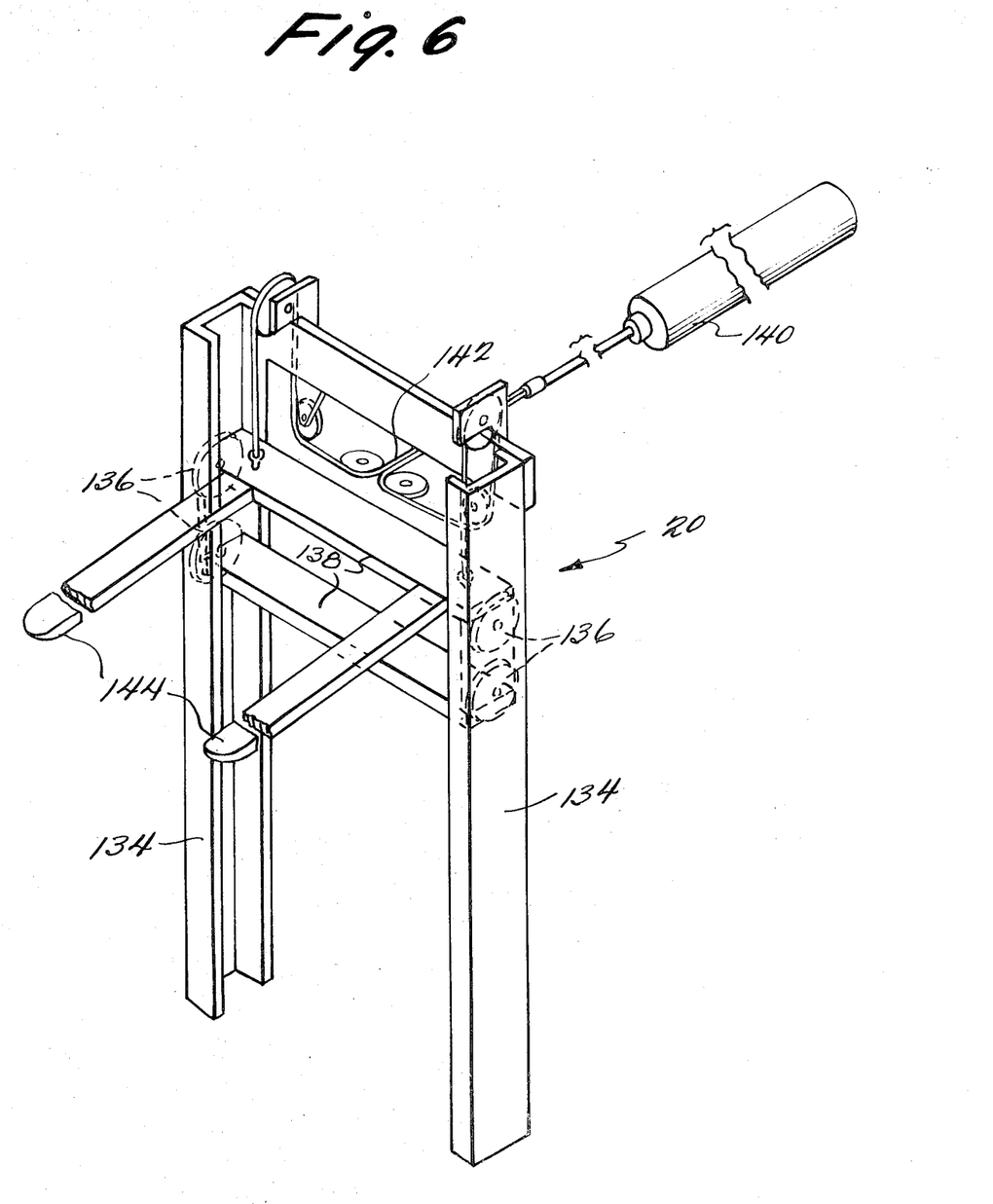
FIG. 6 is a view similar to FIG. 4 illustrating the fork lift mechanism of the present apparatus.

Referring now more particularly to FIG. 6, a preferred embodiment of the fork lift mechanism 20 is illustrated therein. It will be understood that the fork lift mechanism may assume many different forms, including parallel linkage arrangements of the type disclosed in my aforementioned tobacco combine patent. The preferred embodiment, however, is of the vertical track type. As best shown in FIG. 6, the mechanism 20 includes a pair of vertically extending track members 134 rigidly secured to the rear end portion of the horizontal frame section 28 of the wheeled vehicle frame 12, intermediate the ends thereof in parallel opposed relation. Mounted for vertical movement between the track members 134, as by rollers 136, is a vertically extending frame structure 138 of any conventional construction. As can be seen from FIG. 6, the rollers 136 are carried by the sides of the frame structure 138 and rollingly engage the tracks provided by the members 134.

Any suitable means may be provided for effecting the vertical movement of the frame structure 138, with respect to the track members 134. In FIG. 6 a somewhat schematic arrangement is disclosed including a piston and cylinder unit 140 carried by the vehicle frame 12 and connected with the frame structure 138 through an appropriate cable and pulley system 142. The fork lift mechanism also includes the usual fork lift tines, 144, which are rigidly secured to the lower portion of the frame structure 138 at opposite sides thereof and extend rearwardly therefrom in parallel relation with respect to one another.

As best shown in FIGS. 1–3, the trailer assembly 22 includes a rectangularly shaped flat bed 146 of any conventional construction supported by a pair of ground engaging wheels 148 disposed on opposite sides thereof adjacent the central portion thereof and mounted thereon by any conventional suspension means. Mounted transversely beneath the flat bed 146 on opposite sides of the wheels 148 is a pair of socket elements 150 disposed in spaced parallel relation at positions to receive the tines 144 of the fork lift mechanism 20 therein. A draft tongue assembly 152 is mounted on one end of the flat bed 146 which is preferably of the type movable between a vertically disposed inoperative position, as best shown in FIG. 3, and a horizontally disposed operative position for interconnection with the drawbar of the tractor during ground engaging movement. Preferably a suitable railing structure 154 is provided along the side of the flat bed 146 remote from the open ends of the socket elements 150 as well as along the ends of the flat bed. It will be understood that while it is preferable to employ a trailer assembly of the type described above, it is within the contemplation of the present invention to utilize other horizontally extending basket-supporting structures, as for example, a skid platform or a simple pallet.

As best shown in FIGS. 1–3, the platform assembly 24 includes a transversely elongated horizontally disposed platform 156 detachably fixedly mounted on the rear of the vehicle frame 12 in a position generally centered above the fork lift track members 134. Any suitable means may be provided for effecting the detachable mounting, the preferred arrangement shown consisting of a series of transversely spaced brace assemblies 158 suitably bolted to the platform and brackets fixed with respect to the frame 12. As shown, the platform 156 is provided with a fixed vertically spaced peripheral railing 160 supported by a plurality of horizontally spaced vertical posts 162 fixed at their lower ends to the edges of the platform and at their upper ends to the railing 160. The railing 160 extends along the forward side of the platform 156, along the ends thereof and inwardly from the ends of the platform along the rearward side leaving an opening at the central rearward portion of the platform.

The size and location of the platform assembly 24 is determined by its cooperation with the discharge ends of the inclined conveyor assemblies 74, the flat bed 146 of the trailer assembly 22 when suported by the fork lift mechanism 20 in its elevated operative position and the size and shape of the baskets or bin-like structures 26. The size and shape of the latter are of considerably more importance than their specific construction. The size is determined essentially by factors of convenience of manual handling, discharge capacity of the conveyor assemblies 74 (which in turn is a function of the capacity of the defoliating units 14 and the forward speed of the vehicle frame 12) and the lateral size limitations of the platform assembly 22 which would permit travel of the apparatus along highways, etc. In terms of filled weight, the size of each bin-like structure 26, as shown, is such as to weigh between 70 and 100 pounds depending upon the type and condition of the tobacco being handled. Factors such as plant variety, position on the stalk and external moisture content can significantly effect the total leaf weight. In terms of volume, the size of each bin-like structure as shown is approximately 7.6 cubic feet. In relation to bulk curing rack capacity, the size of each bin-like structure as shown, when filled with leaves, contains a supply in loose bulk form sufficient to fill approximately two-thirds of a bulk curing rack. Here again, considerable variation may occur depending upon the density to which the leaves are compressed within the bulk curing rack and the other factors mentioned above. In terms of shape, each bin-like structure 26 as shown is generally rectangularly prismatic, having a width of approximately 20 inches, a depth of approximately 24 inches and a height of approximately 30 inches.

Figure 7:
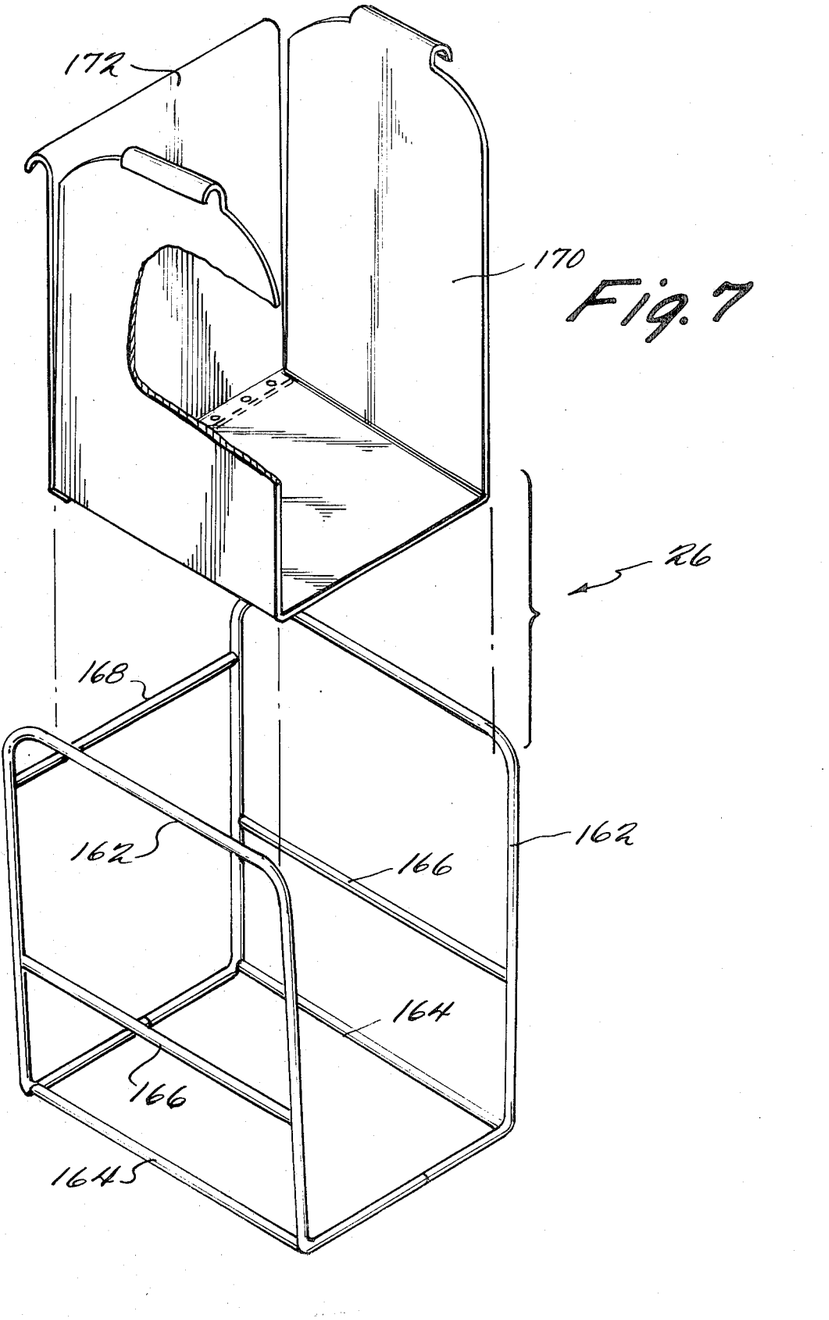
FIG. 7 is an exploded perspective view, with parts broken away, of a basket or bin-like structure forming a part of the apparatus of the present invention.

While the bin-like structure may be made in a variety of different constructions, the preferred embodiment shown consists essentially of a welded skeletonized tubular frame having sheet metal walls attached thereto. As best shown in FIG. 7, the tubular frame includes a pair of inverted U-shaped tubes 162 having the free end portion of the legs thereof bent horizontally inwardly and welded in abutting relation so as to define the bottom and sides respectively of the frame. The bottom is further braced by a pair of straight bottom tubes 164 welded at their ends to the bends in the legs of the tubes 162, while the sides are braced by straight tubes 166 welded at their ends between the legs of the tubes 162. The rear end of the skeletonized frame is formed by a straight tube 168 welded at its ends between the rear legs of the tubes 162. The sheet metal walls at the bottom and sides are formed by a U-shaped member 170 suitably fixed, as by welding or rivets, at the upper free ends thereof to the bight portion of the tubes 162 and at the rear by a vertical panel 172 fixed at its upper end to the tube 168 and having its lower end flanged for securement as by welding or rivets to the rear bight portion of the U-shaped member 170.

With the above-described size and shape characteristics of the basket or bin-like structures in mind, the platform 156 is preferably dimensioned so that it will support at least five baskets 26 in side-by-side relation disposed in a row extending transversely of the vehicle frame or along the length of the platform. The platform can thus be considered to provide five basket supporting stations including two end stations for supporting empty baskets, a central station for supporting filled baskets and a pair of spaced intermediate loading stations for filling empty baskets with leaves. The platform is located so that the loading stations thereon are disposed directly below the discharge ends of the conveyor assemblies 74. To facilitate loading the discharge end of each conveyor assembly 74 is provided with a hood structure 174 which extends downwardly over the associated loading station in spaced relation above the platform 156 sufficient to permit a basket supported on the platform to move thereunder. Extending downwardly from the rearward portion of each hood is a curtain 176 of canvas or other material.

In operation, the vehicle frame 12 is adapted to be self-propelled and steered along a tobacco row in a field under the control of an attendant stationed on the seat 38. The vehicle frame is arranged to straddle two rows and to operate on the row to the right in the direction of travel. It is believed that the operation of the defoliating units 14, the vertically movable mounting mechanism 16 and conveyor system 18 is apparent from the above description. Briefly, it will be noted that the defoliating units 14 serve to remove the leaves from the plants in the row as the vehicle frame 12 is moved therealong in accordance with the teachings of the aforesaid Wilson and Suggs patent. The leaves removed by the defoliating units 14 are deposited upon the lateral conveyor assemblies 42 which serve to move the same laterally outwardly, by the driven rollers 48, so as to be deposited up on the upper operative runs of the horizontal conveyor assemblies 72. As the leaves move rearwardly on the conveyor assemblies 72, they pass under the rollers 132 and are fed between the belts 90 and 102 of the upwardly inclined conveyor assemblies 74. The leaves are carried upwardly between the belts 90 and 102 and issue from the discharge ends of the upwardly inclined conveyor assemblies 74.

The vertical position at which the leaves are removed from the tobacco stalks of the row is determined by the operation of piston and cylinder unit 64 of the vertically movable mounting mechanism 16. The defoliating units 14 shown may be replaced by a rigid unit of the type disclosed in the aforesaid Splinter patent, by disengaging and engaging the units respectively with the attaching pins 70.

Prior to commencing operation, a trailer vehicle 22 is loaded with approximately 20 empty bin-like structures 26, the bins being disposed in telescopic relation to provide clearance on the portion of the bed 146 which is disposed forwardly when the trailer assembly is in its raised position as shown. As shown in the drawings, the bed 146 of the trailer vehicle is of a size to receive approximately 10 filled bin-like structures 26 in two adjacent rows of five side-by-side disposed bins or baskets 26. A second tier of bins or baskets can be mounted on the first tier supported on the bed 146. With the trailer vehicle assembly 22 provided with a full load of empty baskets 26, the trailer is transported by a tractor or the like to the vehicle frame 12 in the field. The operator of the vehicle frame 12 then actuates the piston and cylinder unit 140 to lower the fork lift tines 144 into their lowermost position. The vehicle frame 12 is then backed up so that the fork lift tines 144 will engage within the sockets 150 of the trailer assembly 122. After this engagement has been effected, the operator then actuates the piston and cylinder unit 140 to raise the fork lift tines 144 carrying with it the trailer assembly 22 into its raised operative position as shown in FIGS. 1-3 and an attendant stationed on the forward central portion of the bed thereof.

In the embodiment shown, the attendant stationed on the trailer bed 146 utilizes the end stations on the platform 156 to support empty bins or baskets and the central station on the platform to support successive filled bins from both loading stations. First, however, the attendant places two empty bins at the loading stations as well as the end stations.

It will be noted that the hood assemblies 174 and curtains 176 cooperate with the baskets at the loading stations to effectively close off the open fronts and tops thereof. After the initial two baskets are approximately one-quarter filled, the attendant transfers the leaves collected in one bin to the other leaving one almost empty and the other almost half filled. This procedure insures that the basket will be filled in a generally sequential fashion during subsequent operations. When the first basket is filled, the attendant moves the adjacent empty bin into lateral engagement therewith and by a continuous lateral movement effects a simultaneous movement of the empty bin into the loading station and the filled bin into the central station. Next the operator places a new empty bin at the end station and then places the filled bin at the central station in proper supported relation on the trailer bed 146 (or vice versa).

In this regard, it will be understood that the platform assembly 22 could be formed by the upper horizontal flight of a pair of conveyors on opposite sides of the central station, although the stationary platform is preferred because of its simplicity and relatively low cost. Likewise, it is evident that the central station could be used as an empty bin support, in which case the end stations would be used to support the filled bins.

The above procedure is repeated until the last one or two bins have been filled and placed on the trailer. It will be noted that placement of the last filled bin or bins can only be accomplished by the attendant lowering it down from the platform onto the portion of the trailer bed where he would normally be stationed. The operation of the frame assembly is stopped at this point and the loaded trailer is lowered into ground engagement. It is contemplated that two trailer vehicles and enough bins to supply both (approximately 20) would usually be provided to permit simultaneous operation in the field, as aforesaid, while the loaded trailer is transported to the barn for racking.

At the barn, a rack load of leaves is made up by dumping a filled bin into the rack loader. Such dumping is conveniently accomplished by simply tipping the bin forwardly permitting the leaves to pass from the open front and top of the bin into the rack loader. To complete the loading of the rack, the attendant grabs large arms full of leaves from another bin until about one-half of the leaves are removed, at which time the leaves in the rack loader are given a final adjustment to insure as near as possible a uniform density and then the load is racked.

With the use of the present apparatus it can be seen that the operation at the barn is greatly simplified. Nearly two-thirds of the leaves in the rack are retained substantially in the orientation received from the conveyor system 18, which, while random, is a favorable random orientation due to the controlled conditions at the discharge ends of the conveyors.

The simplification of the racking procedures is accomplished by the provision of relatively simple and inexpensive equipment on the field apparatus. Compared to bulk collection in a large trailer container, a procedure which theoretically requires no attendant but which, in actual practice, invariably is performed with an attendant, the present system provides useful and beneficial leaf handling tasks for the attendant which are not unduly burdensome when compared to the tasks required in a full rack in field operation.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

I claim:

1. Apparatus of the type described comprising a wheeled frame adapted to be moved along a row of mature tobacco plants, tobacco leaf defoliating means carried by said frame for removing tobacco leaves from the tobacco plants in the row as said frame is moved therealong, transversely extending platform means carried by said frame adjacent the trailing end portion thereof at a height above the tobacco row, said platform means providing a plurality of side-by-side stations including a pair of leaf loading stations spaced laterally apart a distance greater than the tobacco row and positioned on opposite sides of the row during the movement of the frame therealong, a pair of laterally spaced conveyor assemblies carried by said frame in a position to receive the leaves removed from the tobacco plants by said defoliating means in opposite sides of the row and to move the leaves rearwardly and upwardly, each of said conveyor assemblies having a discharge end disposed in vertically spaced relation above one of said leaf loading stations of said platform means, a plurality of individual bin-like structures for receiving and supporting a multiplicity of tobacco leaves in loose bulk form, each of said bin-like structures being of a size to be supported at a leaf loading station on said platform means generally below the discharge end of the associated conveyor assembly, means adjacent the discharge end of each conveyor assembly for directing leaves issuing therefrom into a bin-like structure supported at the associated leaf loading station on said platform means therebelow, said plurality of stations including a central station between said leaf loading stations of a size to support a bin-like structure therein and an end station disposed laterally outwardly of each leaf loading station also of a size to support a bin-like structure therein, the arrangement being such that said central and end stations serve to support successive bin-like structures for movement, when empty, laterally into and when filled with leaves, laterally out of each leaf loading station, a wheeled vehicle having means for supporting a plurality of said bin-like structures thereon, and means on the rear end portion of said frame for detachably supporting said wheeled vehicle and for moving the same between a raised position disposed above said tobacco plants in detachably supported relation with respect to said frame for movement therewith along the row and a lowered position adjacent the ground permitting said wheeled vehicle to be detached from supported relation with respect to said frame for independent ground engaging movement.

2. Apparatus as defined in claim 1 wherein each of said bin-like structures has a weight when filled with leaves of between 70 to 100 pounds.

3. Apparatus as defined in claim 2 wherein each of said bin-like structures is open at its top and front and has a capacity of the order of 7.6 cubic feet.

4. Apparatus as defined in claim 3 wherein each of said bin-like structures has a width of the order of 20 inches, a depth of the order of 24 inches and a height of the order of 30 inches.

5. Apparatus as defined in claim 3 wherein said platform means comprises a fixed rectangularly shaped horizontally extending platform of a size to support five of said bin-like structures in side-by-side relation thereon at said plurality of stations with said end stations constituting empty bin stations and said central station constituting filled bin stations.

6. Apparatus as defined in claim 5 wherein said wheeled vehicle includes a rectangular horizontally extending bed for supporting said bin-like structures, the forward portion of said bed providing an attendant's station when said wheeled vehicle is disposed in said raised position, said platform being disposed forwardly adjacent and above said attendant's station.

7. Apparatus as defined in claim 6 wherein said bed is of a size to support two adjacent rows of five side-by-side bin-like structures thereon.

8. Apparatus as defined in claim 6 wherein each of said conveyor assemblies includes a hood structure at the discharge end thereof disposed over the associated loading station, each hood structure having a curtain extending downwardly from the rear edge thereof to a position adjacent the rear edge of the associated loading station of said platform.

9. Apparatus as defined in claim 3 wherein each of said bin-like structures includes a pair of inverted U-shaped tubes having the free end portions of their legs bent inwardly and secured in substantially abutting relation, a plurality of straight tubes fixedly secured in bracing relation to the legs of said U-shaped tubes, and bottom, side and rear walls of sheet material secured to said tubes.

10. Apparatus as defined in claim 1 including means for detachably mounting said platform means on said wheeled frame, each of said conveyor assemblies including a discharge section mounted for pivotal movement between a first operative position wherein the discharge ends thereof are disposed above said platform loading stations as aforesaid and a second operative position when said platform means is detached from said vehicle frame wherein the discharge ends thereof are disposed rearwardly and downwardly from said first operative position so as to discharge the leaves directly into the central portion of said wheeled vehicle which is provided with vertical wall means to contain the same.

11. Apparatus of the type described comprising a frame adapted to be moved along a row of mature tobacco plants, tobacco leaf defoliating means carried by said frame for removing leaves from the tobacco plants in the row as said frame is moved therealong, a multiplicity of individual bin-like structures for receiving and supporting a multiplicity of tobacco leaves in loose bulk form, a horizontally extending bin supporting structure of a size to receive and support thereon a multiplicity of bin-like structures in both empty and filled condition, means at the rearward portion of said frame for detachably fixedly receiving and supporting said bin supporting structure for movement between a lower position adjacent the ground and a raised operative position disposed above the tobacco plants where empty bin-like structures can be removed therefrom and filled bin-like structures can be moved into supported relation thereon during the movement of said frame, platform means carried by said frame in a position above said bin supporting structure when disposed in said raised operative position providing horizontally aligned bin supporting stations including a bin loading station between empty and filled bin supporting stations, said platform means having means thereon for (1) supporting a bin-like structure at said bin loading station, (2) receiving and supporting an empty bin-like structure at said empty bin supporting station while a bin-like structure is supported at said bin loading station, (3) supporting a filled bin-like structure at said loaded bin supporting station for removal therefrom to said bin supporting structure while a bin-like structure is supported at said bin loading station, and (4) supporting an empty bin-like structure for generally horizontal rectilinear movement from said empty bin supporting station into said bin loading station while simultaneously supporting a filled bin-like structure for simultaneous generally horizontal rectilinear movement from said bin loading station into said filled bin supporting station, and conveyor means carried by said frame for conveying the leaves removed by said leaf defoliating means rearwardly and upward and discharging the same into a bin-like structure supported at said bin loading station.

* * * * *